US012797798B2

(12) United States Patent
Williams

(10) Patent No.: US 12,797,798 B2
(45) Date of Patent: Nov. 17, 2026

(54) HUMAN WASTE PROCESSING APPARATUS AND METHOD

(71) Applicant: Cranfield University, Cranfield (GB)

(72) Inventor: Leon Brett Matthew Williams, Cranfield (GB)

(73) Assignee: Cranfield University, Cranfield (GB)

(*) Notice: Subject to any disclaimer, the term of this patent is extended or adjusted under 35 U.S.C. 154(b) by 428 days.

(21) Appl. No.: 18/286,016

(22) PCT Filed: Apr. 7, 2022

(86) PCT No.: PCT/EP2022/059197
§ 371 (c)(1),
(2) Date: Oct. 6, 2023

(87) PCT Pub. No.: WO2022/214576
PCT Pub. Date: Oct. 13, 2022

(65) Prior Publication Data

US 2024/0228334 A1 Jul. 11, 2024

(30) Foreign Application Priority Data

Apr. 7, 2021 (GB) ...................................... 2104942

(51) Int. Cl.
*B01D 61/36* (2006.01)
*C02F 1/44* (2023.01)

(52) U.S. Cl.
CPC ......... *B01D 61/364* (2013.01); *B01D 61/366* (2013.01); *C02F 1/447* (2013.01); *B01D 2311/25* (2013.01)

(58) Field of Classification Search
CPC ................ B01D 61/364; B01D 61/366; B01D 2311/25; B01D 2313/243; B01D 2313/50; C02F 1/447; C02F 9/20; C02F 1/001; C02F 1/283; C02F 1/32; C02F 1/66; C02F 2103/005; C02F 2201/003; C02F 2201/005; C02F 2201/006; C02F 2301/046; C02F 2303/16; C02F 2303/24; C02F 9/00; A47K 11/02; E03D 5/012; E03D 11/10
See application file for complete search history.

(56) References Cited

U.S. PATENT DOCUMENTS 8,246,829 B2 * 8/2012 O'Regan, Jr. ............. C02F 3/30 210/628
2005/0145548 A1 * 7/2005 Rhoades ............ B01D 61/1471 422/62

(Continued)

FOREIGN PATENT DOCUMENTS

CN 101490269 B * 9/2013 ................ C12P 7/06
CN 206965441 U * 2/2018

(Continued)

*Primary Examiner* — Waqaas Ali
(74) *Attorney, Agent, or Firm* — KIRTON McCONKIE; Evan R. Witt

(57) ABSTRACT

A human solid and liquid waste treatment system including method and apparatus for the separation of solid and liquid waste and the further filtration and purification of liquid waste suitable for recycled use. The system comprises a plurality of pre-filtration units provided up-stream of a membrane distillation unit for the energy efficient filtering of waste liquid.

24 Claims, 16 Drawing Sheets

(56) References Cited

U.S. PATENT DOCUMENTS

| | | | | |
|---|---|---|---|---|
| 2010/0089830 | A1* | 4/2010 | Cath | B01D 61/364 210/640 |
| 2016/0107121 | A1* | 4/2016 | Lienhard | B01D 1/0035 210/640 |

FOREIGN PATENT DOCUMENTS

| | | | | |
|---|---|---|---|---|
| DE | 3941673 | A1 * | 6/1991 | E03F 5/14 |
| WO | WO-02055182 | A1 * | 7/2002 | B01D 61/081 |

* cited by examiner

HUMAN WASTE PROCESSING APPARATUS AND METHOD

FIELD OF INVENTION

The present invention relates to human waste processing apparatus and in particular, although not exclusively, to a toilet waste system configured to process both solid and liquid waste and generate recycled liquid suitable for further applications.

BACKGROUND

A variety of different types of toilet and wastewater processing systems are used in developing countries or for applications where there is no or limited fresh water supply and sewage treatment facilities. Additionally, large populations across the world lack access to usable water including potable water and water for irrigation as part of crop production.

Dry toilets including for example pit-based latrines and ground-based composting toilets are used widely in developing countries. These toilets generally do not require specialist equipment and infrastructure. However, they are typically regarded an unhygienic and unsanitary option. Chemical toilets offer a more advanced solution to ground-based toilets but still produce undesirable odours as well as creating downstream environmental concerns based on the chemicals used. Additionally, chemical toilets are typically emptied by hand and this poses a health and safety risk to servicing personnel.

The demands and technical challenges associated with toilets within developing countries are also relevant for toilets employed within public transport. Here, conventional water-flushed toilets require large freshwater storage tanks and corresponding downstream collection tanks for both solid and liquid waste. These tanks add weight to vehicles and can be difficult to accommodate as part of carriages or within cabins where space is limited.

Accordingly, what is required is a toilet and human waste processing system that addresses the above problems.

SUMMARY OF THE INVENTION

It is an objective of the present invention to provide a toilet and/or human waste processing system and apparatus to process both human solid and liquid waste deposited into a toilet or similar vessel and to recover and process the liquid waste for further use and/or convenient disposal.

It is a specific objective to provide a toilet and/or human waste processing system and apparatus to process human liquid waste to filter and to remove solid matter and solid particulates optionally in addition to toxins and bacteria so as to generate processed liquid suitable for further applications such as hand washing, toilet flushing, crop irrigation etc.

The objectives are achieved via a human waste processing apparatus and system that utilises a variety of sequential staged filter treatment processes and units adapted specifically to separate sequentially solid matter from liquid waste. The present apparatus and system is configured specifically to require little or zero flushing water and/or additional liquids and chemicals as part of the filtration process. In particular, the present apparatus and system utilises liquid processing loops for the efficient use of liquid and additional materials and apparatus. The present system is designed specifically to minimise the number of working components and to facilitate transport to remote locations and for installation and use within confined spaces. Moreover, the present system attempts to minimise the use of chemicals and material that are not suitable for recycling or further uses. Membrane distillation according to the present system is advantageous to separate non-volatile components, such as ions, macro-molecules and colloidal particles from a condensate liquid generated by the distillation-condensation cycle and the water-repelling nature of the membrane.

Reference within the specification to 'permeate' encompasses a liquid that is the result of vapourisation and condensation via a membrane distillation unit. Such a term includes a condensate, a vapour, a gas, a product and the condensation of vapour or a gas within or outside the membrane module/unit.

According to a first aspect of the present invention there is provided human waste processing apparatus comprising: at least one pre-filter treatment unit having a pre-filter storage tank, a particulate filter to separate particulate suspended within waste liquid and a liquid flow inlet and outlet; a membrane distillation unit having a membrane distillation vessel with an internal filter membrane, a primary flow liquid inlet and outlet and a permeate flow outlet, the primary flow liquid inlet connected in fluid communication to the liquid flow outlet of the pre-filter treatment unit; and a flow actuator to drive a flow of waste liquid through the pre-filter treatment unit and in a flow direction towards the membrane distillation unit.

Preferably, the pre-filter treatment unit comprises: a first pre-filter treatment unit having a first pre-filter storage tank and a first particulate filter. Optionally, the pre-filter treatment unit comprises a second pre-filter treatment unit having a second pre-filter storage tank and a second particulate filter. Optionally, the pre-filter treatment unit comprises a plurality of particulate such as in the range 2-4, 2-6 filters. Optionally, the filters may comprise the same and/or different sized filtration meshes/membranes. Optionally, the pre-filter treatment unit comprises a first particulate filter that comprises a first mesh pore size; and a second particulate filter that comprises a second mesh pore size being less than the first mesh pore size. Optionally, the pore size of the first and second filters may be approximately the same. Optionally, the first particulate filter comprises a mesh pore size in a range 50 to 800 μm, 50 to 150 μm or 80 to 120 μm; and the second particulate filter comprises a mesh pore size in a range 0.5 to 50 μm, 0.5 to 20 μm, 0.5 to 10 μm or 0.5 to 5 μm.

Reference within the specification to 'mesh pore size' refers to the size of each aperture or opening of the mesh according to conventional standards ISO 565:1990 and ISO 3310-1:2000 and EN 933-1.

Preferably, the first and second pre-filter treatment unit comprise respective mountings to releasably mount the first and second particulate filters to enable removal and insertion of the first and second particulate filters at the respective first and second pre-filter treatment units. Such mountings may include clips, bayonet, screw or push-fit connections to provide convenient assembly and disassembly of the filtration units and the interchange of filter meshes of different pore size. Optionally, each particulate filter comprises a cap, a hollow cylindrical mesh, a base and respective seals.

Optionally, the first and second pre-filter treatment units comprise a respective purge valve and purge outlet connected in fluid communication to the respective particulate filters, the apparatus further comprising respective return flow conduits extending from the purge outlets to a front end holding tank and/or the least one pre-filter treatment unit to provide a filtration circuit. Optionally, the purge valve is connected to a supply flow conduit extending between the pump and the inlet of the pre-filtration unit. Preferably, the apparatus further comprises a supply flow conduit connected in fluid communication to the front-end holding tank and the liquid flow inlet of the pre-filter treatment unit.

Preferably, the apparatus comprises a solid-liquid coarse filter to separate solid waste from the waste liquid positioned in a fluid flow direction upstream of the pre-filter treatment unit. The coarse filter may comprise a mesh/port comprising a 1000 μm mesh, of a material such as a polyester, nylon or stainless-steel mesh. Preferably, the mesh is mounted at the filter via a mounting that enables the convenient interchange of the mesh. Preferably, the solid-liquid coarse filter comprises a cartridge configuration to enable convenient interchange. Optionally, the coarse filter comprises a flange, grate or screen comprising apertures, perforations, slots or elongate gaps (e.g. of approximately 1 mm) to remove unbound liquid and paper pulp. Such apertures or slots work cooperatively with the mesh to provide filtration of solid and liquid waste.

Preferably, the apparatus comprises a linear and/or rotary actuator to transport and separate the solid and liquid waste and positioned in a fluid flow direction upstream of the pre-filter treatment unit. Preferably, linear and/or rotary actuator is a solid-liquid screw conveyor. Optionally the linear and/or rotary actuator is a mechanical device which converts rotary motion into linear motion. Such a device includes a circular conveyor, a rack and pinion, a belt, mesh or rib conveyor. Preferably, the screw conveyor comprises a central shaft from which extends a helical blade. Preferably, the solid-liquid coarse filter is positioned radially adjacent the solid-liquid coarse filter. Preferably, the solid-liquid coarse filter is positioned at a wall of a jacket or housing of the solid-liquid screw conveyor. Preferably, the solid-liquid screw conveyor is inclined at an inclined angle extending upwardly from a solid-liquid receiving chamber forming part of a toilet.

Preferably, the flow actuator is a pump connected in a fluid flow direction between the solid-liquid coarse filter and the pre-filter treatment unit. Reference within this specification to a 'pump' may be a positive-displacement pump, a rotary pump, a reciprocating-type positive displacement pump such as a piston pump, plunger pump or a diaphragm pump, or other pump mechanism such as a linear-type positive displacement pump for the manual or automated or semi-automated transport of liquid. Optionally, the apparatus comprises a plurality of pumps positioned at different locations within the fluid network.

Preferably, the apparatus comprises a holding tank positioned in a fluid flow direction between the pre-filter treatment unit and the membrane distillation unit. Preferably, the apparatus comprises a first distillation flow pump to drive a flow of liquid from the holding tank to the membrane distillation unit. Preferably, the apparatus further comprises a permeate collection reservoir to collect liquid permeate output from the permeate flow outlet.

Preferably, the membrane distillation unit further comprises a permeate flow inlet connected in fluid flow with the permeate flow outlet to provide a permeate flow loop through the filter membrane. Preferably, the apparatus further comprises a second distillation flow pump connected in fluid flow with the permeate flow loop. Preferably, the apparatus further comprises a permeate output filter connected in fluid communication to an outlet of the permeate collection reservoir to receive and collect output from the membrane distillation unit.

Preferably, the apparatus comprise at least one conduit network coupled to the membrane distillation unit to provide a feed loop conduit/manifold having a feed loop inlet and a feed loop outlet at respective regions and connected in fluid communication to the membrane distillation unit. Optionally, the feed loop conduit/manifold is connected to the holding tank positioned between the pre-filter treatment unit and the membrane distillation unit. Preferably, the feed loop conduit/manifold comprises a pump. Preferably, the feed loop conduit/manifold comprises a heater. Preferably, the pump and heater of the feed loop conduit/manifold are positioned in a fluid flow direction up-stream of a feed inlet at the membrane distillation unit. Preferably, the holding tank is positioned in a fluid flow direction upstream of the pump and/or the heater. According to the one configuration, the pump and heater are configured to drive a heated flow of the waste liquid to be filtered through the membrane distillation unit. Preferably, the feed loop conduit/manifold is connected in fluid communication down-stream of the pre-filter treatment unit so as to receive filtered waste liquid. Preferably, the feed loop conduit/manifold is coupled in fluid communication with the holding tank and the holding tank is also coupled in fluid communication to the pre-filter treatment unit. Such a configuration provides that the holding tank represents a reservoir that receives both waste liquid from the pre-filter treatment unit and also a flow of liquid within the feed loop having passed through the membrane distillation unit. The outflow from the holding tank is then fed to the pump and the heater with the liquid output from the heater supplied to the membrane distillation unit. Preferably, the feed loop conduit/manifold comprises an outlet to provide an outflow/purge of liquid. Preferably, the outlet conduit of the feed loop is positioned in a fluid flow direction between the pump or heater and the membrane distillation unit. Preferably, the outlet conduit is connected to a waste collection tank. Preferably, the feed loop conduit/manifold comprises one or a plurality of valves, sensors, heaters and/or pumps.

Preferably, the apparatus comprises a permeate feed loop conduit/manifold coupled in fluid flow communication with the membrane distillation unit. Preferably, the permeate flow loop conduit/manifold comprises at least one pump, at least one condenser and/or at least one permeate holding tank. Preferably, an outlet of the permeate flow loop/conduit at the membrane distillation unit is connected in fluid communication with a condenser and an inlet of the permeate flow loop conduit/manifold at the membrane distillation unit is connected in fluid communication to the pump. Preferably, the permeate holding tank is positioned in a fluid flow direction between the condenser and the pump. Preferably, the holding tank comprises an overflow liquid outlet. Preferably, the overflow liquid outlet comprises a weir arrangement. Preferably, the outlet of the permeate holding tank is connected in fluid communication to a storage tank and/or output of the apparatus. Preferably, a filter (for example a carbon filter) is connected in fluid communication with the permeate holding tank so as to receive an outflow of liquid from the permeate holding tank and to filter the liquid to remove odours and/or any pathogens, bacteria, microbes etc. Optionally, the filter at this polishing step comprises an antimicrobial compound. Optionally, the filter at the polishing step comprises silver and/or activated granular carbon.

The present apparatus comprises a membrane distillation unit having a plurality of liquid flow loops that are separated/partitioned from one another via the internal membrane of the membrane distillation unit so as to provide a partitioned liquid waste feed loop and a separate permeate loop both flowing through the membrane distillation unit during normal operation.

Optionally, the present membrane distillation unit comprises a configuration being any one of: direct contact membrane distillation (DCMD); air gap membrane distillation (AGMD); sweep gas membrane distillation (SGMD); vacuum membrane distillation (VMD).

Optionally, the membrane distillation unit comprises an air gap membrane distillation configuration and the apparatus further comprises: a cooling fluid network having a fluid flow conduit to contain a cooling fluid, a cooling fluid tank, and a cooling fluid pump to drive a flow of the cooling fluid through the conduit. Optionally, the membrane distillation unit comprises a vacuum membrane distillation configuration and the apparatus further comprises: a vacuum manifold having a vacuum pump and a condenser connected to the membrane distillation vessel to drive a flow of permeate from the membrane to the condenser.

Optionally, the permeate output filter comprises a carbon filter including any one or a combination of: charcoal, activated charcoal, an antimicrobial.

Preferably the membrane distillation unit comprises a heater or uniting unit to heat a liquid to be introduced to the membrane distillation unit. In particular, the heater is configured to heat the liquid flowing into the membrane distillation unit and/or to heat the liquid within a storage region or tank prior to introduction or reintroduction to the membrane distillation unit. Optionally, the heater may comprise an electric heating coil, heating tape, an electrical resistance heating wire, a liquid based, oil based or air based heating device or a Peltier device or Peltier array. Optionally the heater is configured to heat the liquid for introduction to the membrane distillation unit to a heating temperature in a range 40 to 80 °C and optionally around 65 °C.

According to a second aspect of the present invention there is provided toilet waste processing apparatus comprising: a front-end holding tank provided at, connected or connectable to a toilet to receive solid and liquid human waste; and the apparatus of any preceding claim connected in a fluid flow direction downstream of the front-end holding tank.

According to a third aspect of the present invention there is provided a method of processing human waste comprising: receiving waste liquid from a toilet at a pre-filter treatment unit using a flow actuator; filtering the waste liquid at the pre-filter treatment unit using a particulate filter at or connected in fluid communication with a pre-filter storage tank; transferring filtered waste liquid from the pre-filter treatment unit to a membrane distillation unit; filtering the waste liquid through a filter membrane within a membrane distillation vessel of the membrane distillation unit; and outputting liquid permeate from the membrane distillation unit.

Optionally, the step of outputting liquid permeate comprises collecting the liquid permeate from the membrane distillation unit at a permeate collection reservoir.

Optionally, the step of filtering the waste liquid at the per-filter treatment unit comprises: filtering the waste liquid using a first pre-filter treatment unit having a first particulate filter of a first mesh pore size; and filtering the waste liquid using a second pre-filter treatment unit having a second particulate filter of a second mesh pore size wherein the second mesh pore size is less than the first mesh pore size.

Optionally, the method further comprises purging solid waste entrapped at the pre-filter treatment unit via a purge valve connected to the pre-filter treatment unit; and transferring the solid waste purged from the pre-filter treatment unit via a return flow conduit to a front-end holding tank and/or an inlet of the pre-filter treatment unit.

Optionally, the method comprises prior to the step of filtering the waste liquid at the pre-filter treatment unit, filtering the waste liquid via a solid-liquid coarse filter to separate solid waste from waste liquid, a mesh pore size of the solid-liquid coarse filter being greater than a mesh pore size of the particulate filter of the pre-filter treatment unit. Preferably, the method comprises transporting solid waste and waste liquid at the solid-liquid coarse filter using a solid-liquid screw conveyor. Preferably, the method further comprises heating the waste liquid after the step of filtering the waste liquid by the pre-filter treatment unit and prior to filtration at the membrane distillation unit.

Preferably, the method further comprises circulating the waste liquid through the membrane distillation unit via a feed loop and simultaneously collecting liquid permeate from the membrane distillation unit. Preferably, the method further comprises filtering permeate output by the membrane distillation unit using a permeate output filter, the permeate output filter comprising any one or a combination of: charcoal, activated charcoal, an antimicrobial.

According to a fourth aspect of the present invention there is provided a toilet comprising: a stationary upper bowl having an upper bowl surface; a rotatable lower bowl part having a lower bowl surface and being rotatable about an axis between a first position to receive human waste and a second position; a receiving chamber located at least partially below the lower bowl part to receive human waste from the lower bowl part in the second position; a transporter extending from and in communication with the receiving chamber to transport the human waste from the receiving chamber.

Optionally, the transporter comprises a linear and/or rotary actuator to transport the solid and liquid waste from the receiving chamber. Optionally, the transporter may be a solid-liquid screw conveyor. Optionally the transporter is a mechanical device which converts rotary motion into linear motion. Such a device includes a circular conveyor, a rack and pinion, a belt, mesh or rib conveyor. Preferably, the transporter is an elongate screw conveyor.

Preferably, the toilet further comprises a solid-liquid coarse filter to separate solid waste from waste liquid deposited within the receiving chamber, the coarse filter positioned at a waste liquid outlet port of the toilet and adjacent the transporter. Preferably, the coarse filter is positioned at a jacket or housing containing the screw conveyor. Preferably, a solid outlet port is provided at or towards one end of the jacket and the coarse filter and liquid outlet port is located distally from the solid outlet port. Preferably, the solid outlet port is positioned at an upper end of the jacket and the liquid output port is positioned at or towards a second lower end of the jacket. Preferably, the screw conveyor extends axially between a first and second end of the jacket wherein a first end of the screw conveyor is provided in fluid communication with the receiving chamber.

Optionally, the toilet comprises at least one drivable gear connected to the lower bowl part and concentric on the axis. Optionally, the toilet may comprise a drive motor having at least one driving gear connectable to the drivable gear.

Optionally, the toilet may comprise a moveable mechanical arm having a first end connected to the lower bowl part to actuate rotation of the lower bowl part. Optionally, the toilet may comprise a lid or seat, a second end of the moveable mechanical arm connected to the lid or seat such that a pivoting of the lid or seat provides a cooperative rotation of the lower bowl part about the axis.

Optionally, the lower bowl part is rotatable about the axis through an angle in the range 45 to 360°, 45 to 270°, 40 to 180°.

Preferably, the upper and lower bowl surfaces are configured to generally align to define collectively a unitary bowl receiving surface when the lower bowl part is in the first position.

Preferably, the toilet comprises a housing that defines the receiving chamber and at least partially accommodates at least the lower bowl part. Preferably, the jacket that mounts the screw conveyor is formed integrally with the housing and extends upwardly at an inclined angle from a lower region of the housing.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 5:
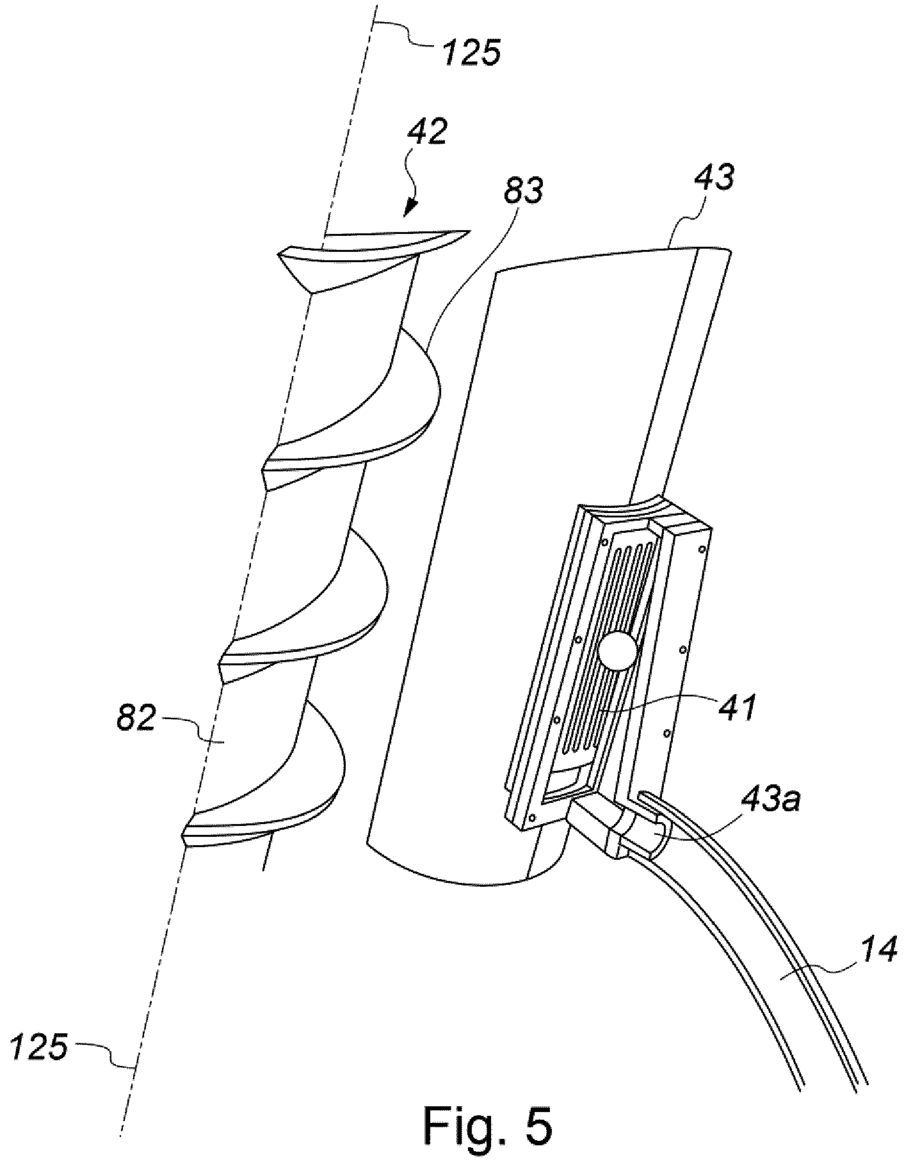
FIG. 5 is a magnified perspective view of part of a pre filter unit of the system of FIG. 1.

A human waste processing system according to the present concept is adapted to process both human solid and liquid waste deposited into a toilet or similar vessel and to process and recover liquid waste for further use and/or convenient disposal. The present system is specifically configured for use with low-water-volume flush toilets and 'dry' toilets. In particular, the present system is configured to separate solid waste and liquid waste deposited into a toilet or similar vessel with the liquid waste being further processed via a plurality of sequential filtration stages using a plurality of different types and configuration of filter units. As described and referring to FIG. 1, the present human waste processing system comprises what may be regarded as a 'front end' assembly that includes an input vessel such as a toilet 11. Toilet 11 is provided with a drain port 12 for the output of predominantly solid waste (faeces and paper) and is coupled in fluid communication to solid waste collection tank (not shown). Toilet 11 also comprises a liquid outlet or liquid drain 43*a* (FIG. 5) connected to a diaphragm pump 13 that is configured to pump and transport the predominantly liquid waste (received at toilet 11 and that has been at least partially separated from the deposited solid waste) to a prefiltration unit. Referring to FIG. 5, toilet 11 is provided with a separator in the form of a screw conveyor 42 adapted to transport the solid waste upwardly against gravity. Such solid waste includes predominantly faeces and toilet paper but may also include seeds, nuts, sanitary products and small plastic objects. Screw conveyor 42 comprises an elongate shaft 82 (centred on a rotational axis 125) from which extends a helical blade, fin or thread 83. The helical path of blade 83 is relatively 'open' so as to have a large helical or taper angle (relative to axis 125). Additionally, shaft 82 comprises a minimised radius being relatively thin. Such configurations are advantageous to maximise transport of solid waste and to minimise clogging and blockage. The solid waste (faeces and toilet paper) has an important role on the sludge rheology and the screw conveyor is designed via the pitch, size and axially spacing of the helical blade 83 to avoid over compacting of the paper pulp, which may otherwise clog the solid outlet 12 and to reduce back-pressure and torque on the motor (not shown) that drives rotation of the conveyor 42 at the filter 41.

A relatively stiff polymer mesh filter 41 is mounted on the side wall of a jacket 94 (FIG. 12) that houses the screw conveyor 42. Optionally a pore size of mesh may be around 0.5 mm. Such a configuration is designed to provide a basic separation of bound and unbound liquid waste from the solid waste stream. Mesh filter 41, mounted at filtration unit 43, is provided with a liquid outlet 43*a* connectable to a 'front end' manifold 14 having a diaphragm pump 13. Accordingly, liquid waste separated from the solid waste by screw conveyor 42 and filter 41 is forced downstream through manifold 14 via diaphragm pump 13.

Figure 1:
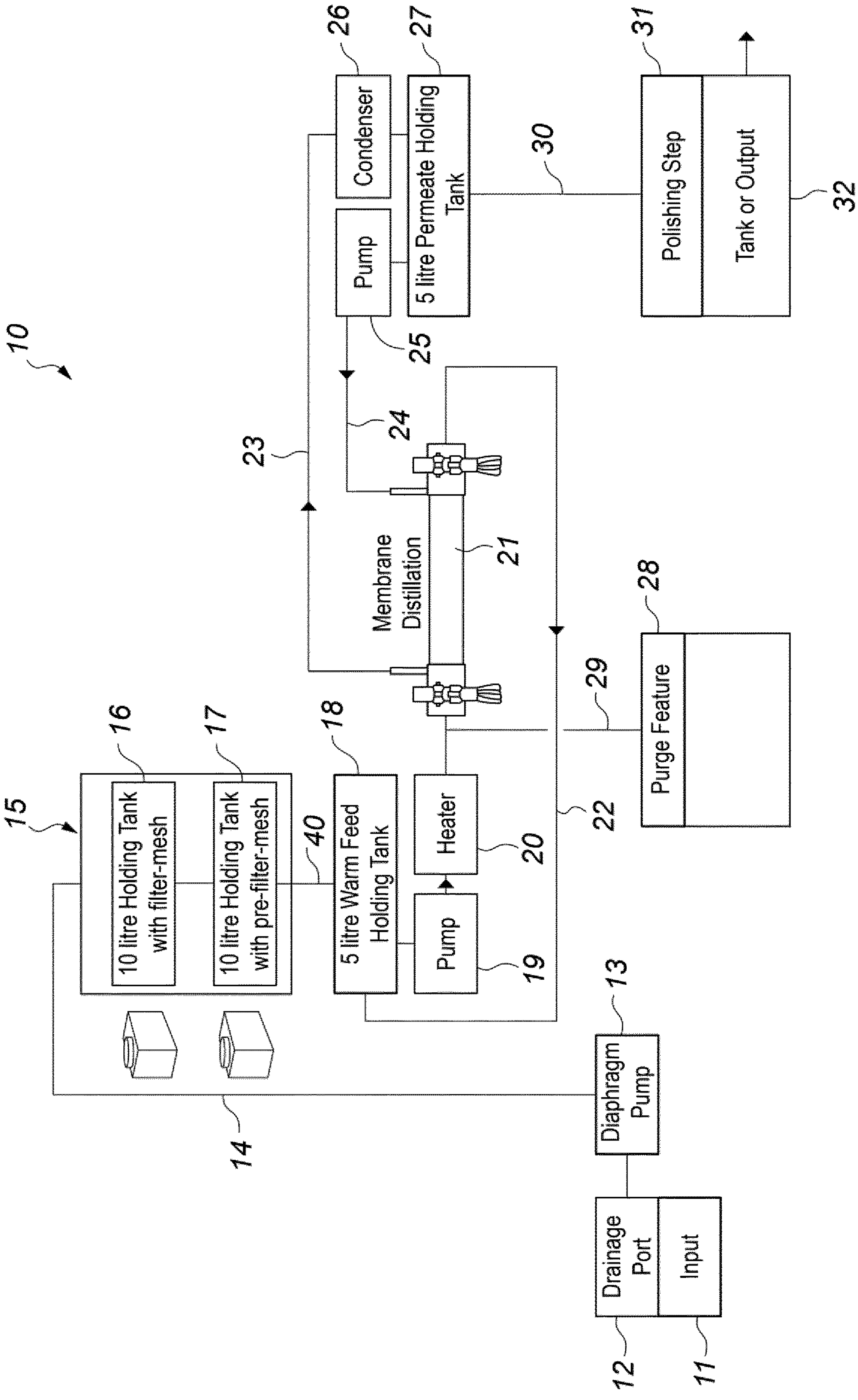
FIG. 1 illustrates schematically selected components of a human waste processing system having a membrane distillation unit and a plurality of pre-filter units according to a specific implementation of the present invention.
Figure 3:
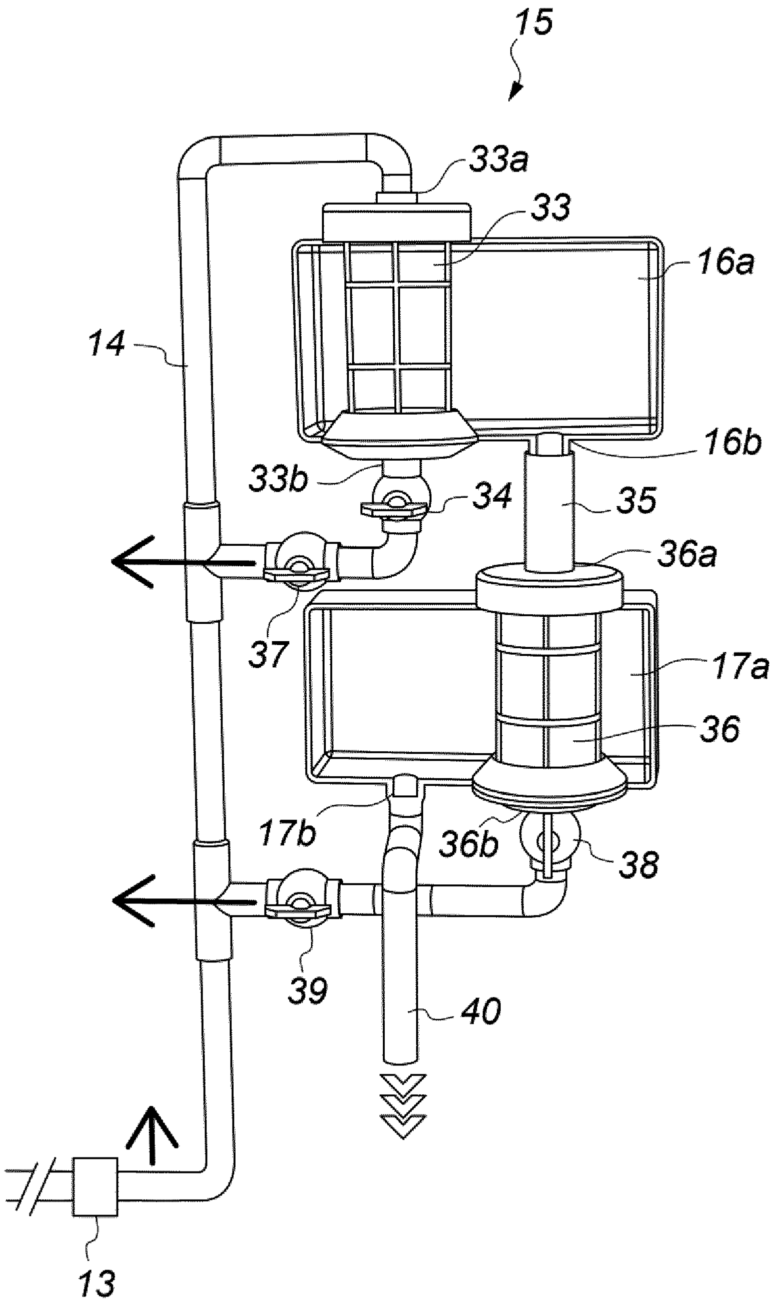
FIG. 3 is a perspective view of a pre-filter arrangement forming part of the processing system of FIG. 1.

The apparatus 10 further comprises a liquid pre-filtration unit 15 having a plurality of pre-filter units or modules for the sequential filtering of waste liquid output from the drainage port 43*a*, referring to FIG. 1. Referring to FIGS. 1 and 3, a first pre-filter unit 16 comprises a holding tank 16*a* and a mesh filter 33. A second pre-filter unit 17 also comprises a holding tank 17*a* and a mesh filter 36. The pre-filtration unit 15 is coupled in fluid communication with a warm feed holding tank 18 forming part of a feed (or primary liquid flow) loop associated with a membrane distillation unit 21. A diaphragm pump 19 is coupled in fluid communication with holding tank 18 and in flow communication with a heater 20 optionally being an electric heating coil, a hot runner heating circle coil heater or a Peltier device or Peltier array to provide a heating temperature in a range 40 to 80 °C and preferably around 65 °C. The pump 19 and/or heater 20 are coupled in fluid communication to a membrane distillation unit 21 as described referring to FIGS. 6 to 8A. Membrane distillation unit 21 further comprises a permeate loop 23 comprising a condenser 26 a second diaphragm pump 25, coupled in turn, to the membrane distillation unit 21 via loop conduit 24. A permeate holding tank 27 is coupled in fluid communication to pump 25 and condenser 26. A weir overflow arrangement is coupled to an output tank 32 via an outlet conduit 30. At least one filter such as an activated charcoal, silver impregnated charcoal, UV and/or biological filter 31 are provided at or immediately upstream of output tank 32. Apparatus 10 further comprises purge components indicated generally by reference 28, coupled to the membrane distillation unit 21 via conduit 29 so as to provide a purging of entrapped solid material deposited/collected within the membrane distillation unit 21.

Figure 2:
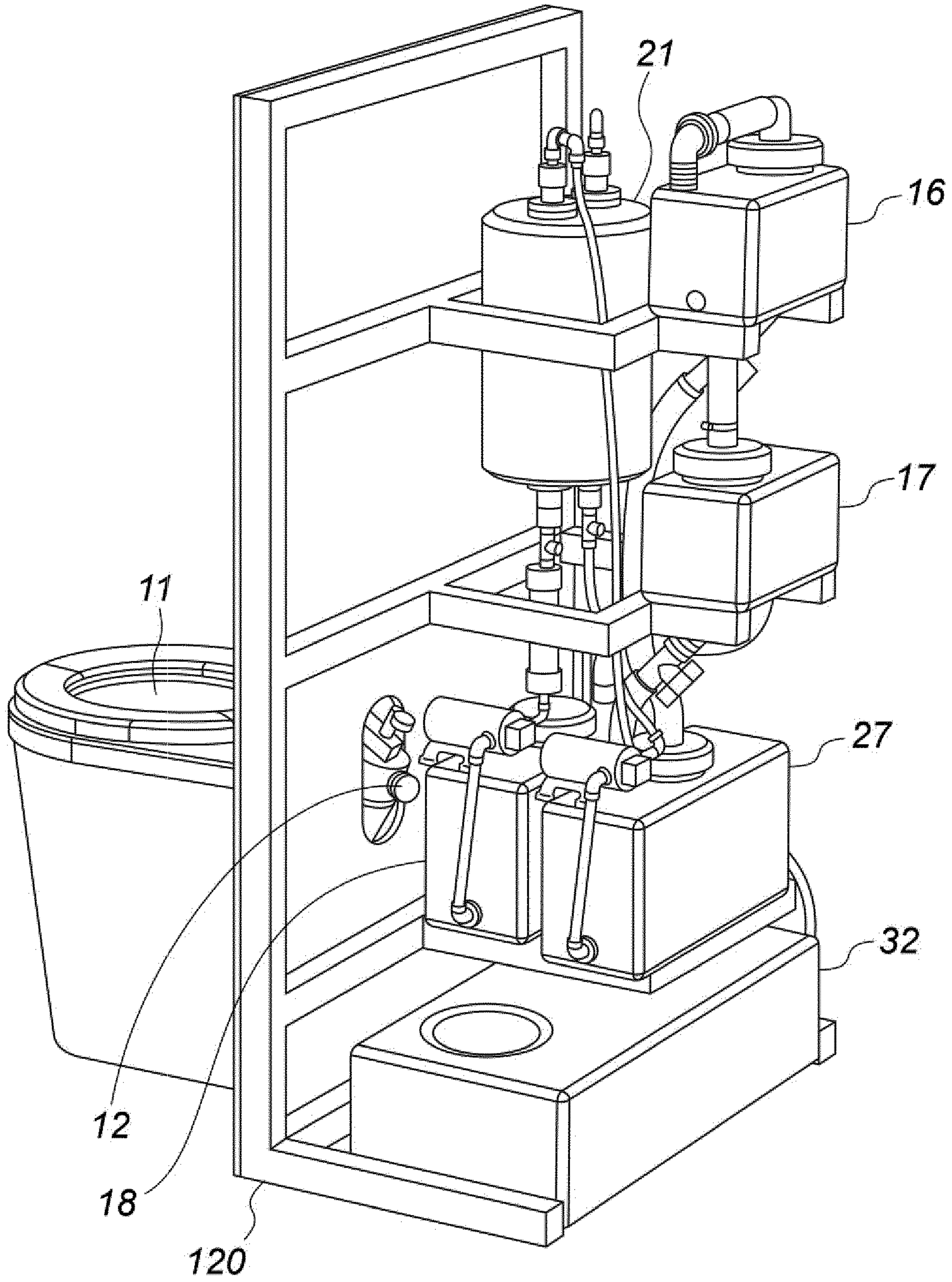
FIG. 2 is a perspective view of selected components of the human waste processing apparatus of FIG. 1.

FIG. 2 illustrates selected components of the filtration apparatus of FIG. 10 including in particular toilet 11, pre-filter units 16, 17, membrane distillation unit 21, warm feed holding tank 18, permeate holding tank 27 and output tank 32. The present apparatus 10 may be installed and at least partially housed within a support frame 120 so as to provide an integral modular unit that may be conveniently transported and installed at a stationary or mobile site that may have no or limited access to mains or fresh water.

Referring to FIG. 3, waste liquid manifold 14 (extending downstream of the pump 13) is connected in fluid communication with filter 33 of the first pre-filter unit 16. Filter 33 comprises a purge outlet 33*b* coaxial with inlet 33*a* that, is in turn, coupled to manifold 14. A rotatable ball valve 34 provides control and a switching between the operational first mode ('use' status) of filter 33 and a second mode ('purging' status). A further rotatable ball valve 37 is connected in fluid communication downstream of ball valve 34. Valve 37 is connected to the wastewater supply manifold 14 to return the purged liquid (and solids) from filter 33 into the supply manifold 14 for re-supply to the first filter unit 16. According further implementations, ball valve 37 may be coupled alternatively or in addition to the toilet 11 and/or an intermediate holding tank from which waste liquid and solid particulate is delivered into the wastewater supply manifold 14.

A conduit 45 provides fluid communication between first pre-filter tank 16*a* and a second pre-filter 36 of the second pre-filter unit 17*a*. Conduit 35 extends between a liquid outlet 16*b* of tank 16*a* and an inlet 36*a* of second pre-filter 36. Conduit 35 is coupled to the inlet 36*a* of filter 36. As with the first filter unit 16, the second pre-filter 36 also comprises a coaxial outlet 36*b* provided with a rotatable ball valve 38 connected in fluid communication to a return ball valve 39 which is, in turn, coupled to the wastewater supply manifold 14 and/or the 'front end' of the solid and liquid waste collection tank. An outlet 17*b* of pre-filter tank 17*a* is coupled to the conduit 40 to transfer filtered liquid to the warm feed holding tank 18.

Figure 4:
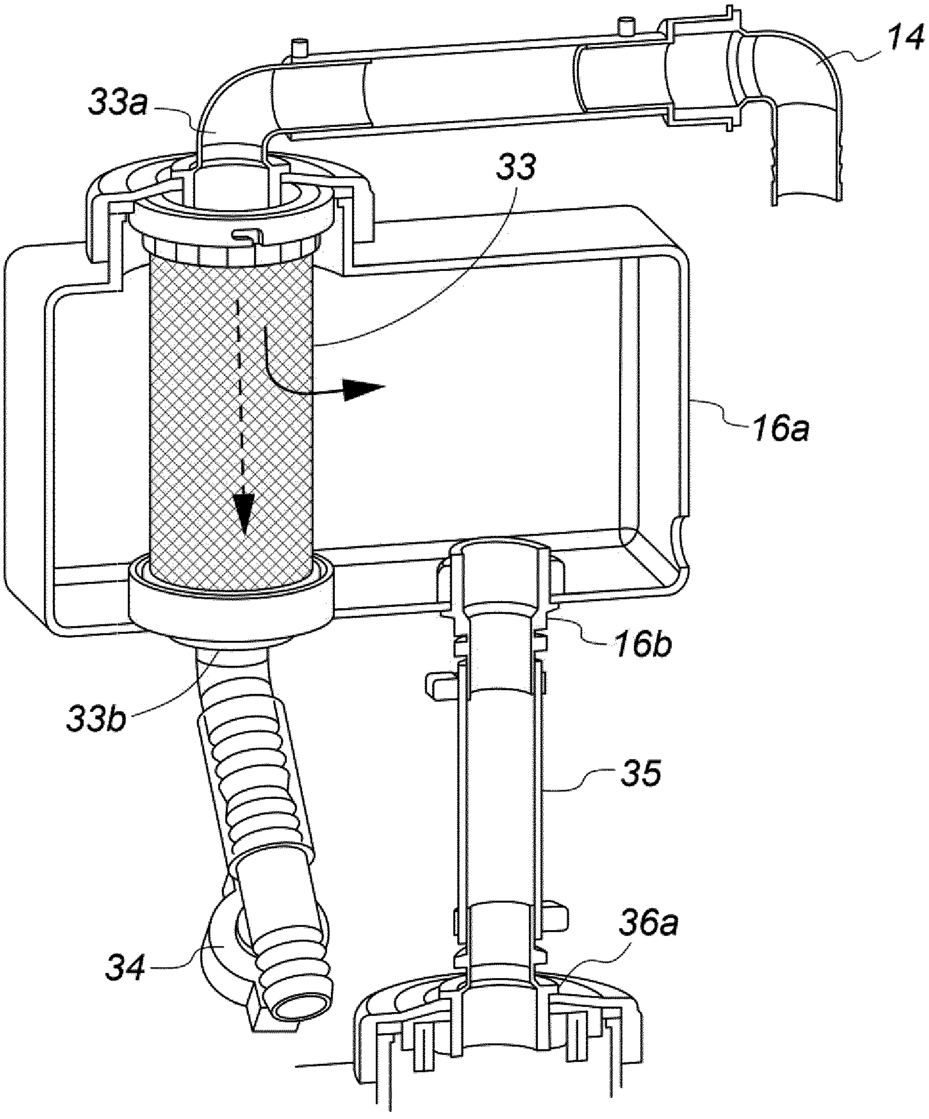
FIG. 4 is a magnified perspective view of one of the pre-filter units of the system of FIG. 1.

Referring to FIGS. 3 and 4, each of the filters 33, 36 comprise a hollow cylindrical mesh illustrated in FIG. 4 referring to the first pre-filter unit 16. The cylindrical mesh body extends between inlet 33*a* and outlet 33*b*. Each filter 33, 36 is modular to allow interchange of the mesh. According the specific implementation, filter 33 comprises a 400 or 900 μm mesh and filter 36 comprises a 1 to 10 μm polyester mesh (although may comprise a 400 or 900 μm mesh). Optionally the meshes are polyester. However, alternative mesh materials may be used for both or either filter including nylon, stainless steel etc. The aperture size of each mesh may be selected to suit the dietary habits of users of the current system with different mesh sizes being selected for optimised filtering of solid fats for example that may be at a higher concentration for carnivores relative to vegetarians. In use, waste liquid is delivered into a first pre-filter 33 via inlet 33*a*. The waste liquid is then filtered through the mesh walls laterally into the first tank 16*a* (as a consequence of the ball valve 34 being closed). The pre-filtered liquid then transfers to the second pre-filter 36 and into tank 17*a* via lateral flow through the filter mesh. The twice filtered waste liquid is then delivered to the warm feed holding tank 18 via conduit 40. In a cleaning or purging operation, accumulated fats and other solid bodies and particulates entrapped at the interior of each cylindrical pre-filter 33, 36 is purged back to either the supply manifold 14 or towards the front end toilet 11 (or initial solid and liquid holding tank). This purging is achieved via control and an opening of valves 34, 35, 38 and 39 which when create a turbulent liquid flow within each respective filter 33, 36 to dislodge the solid particulates and effectively wash each mesh filter. Such control may be manual and/or automated as described herein.

Figure 6:
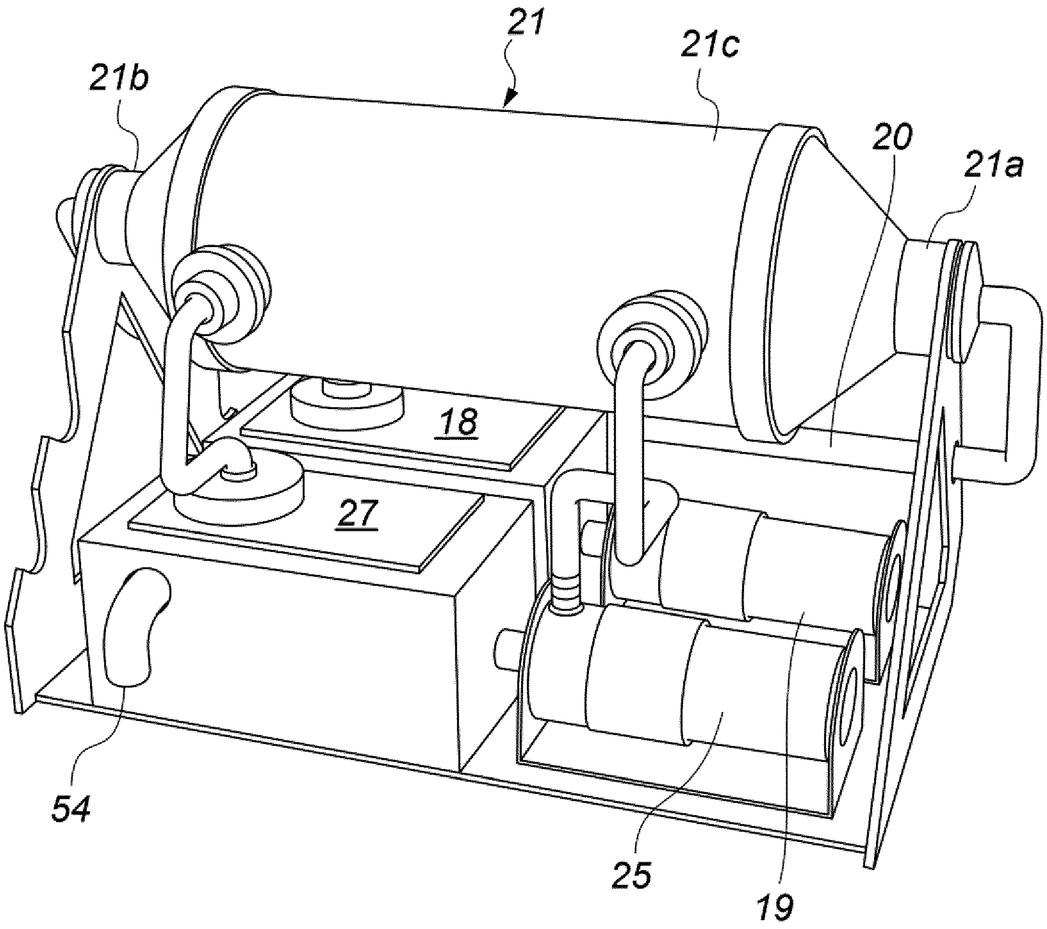
FIG. 6 is a perspective view of a membrane distillation unit forming part of the system of FIG. 1.
Figure 9:
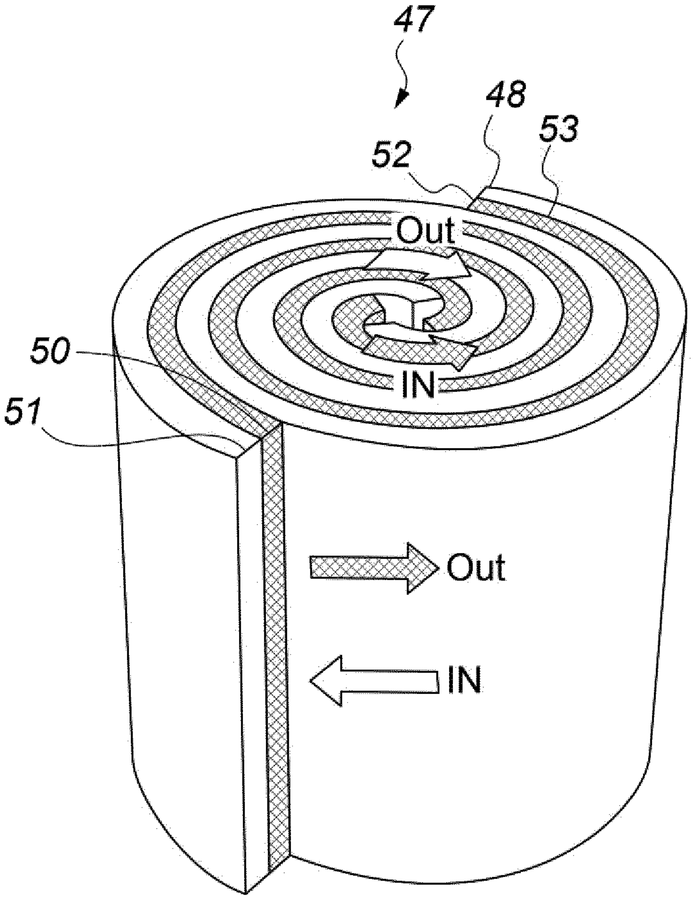
FIG. 9 is a perspective view of a filter membrane housed within the membrane distillation unit of FIG. 6.

Referring to FIG. 6, the pre-filtered waste liquid is then transferred to membrane distillation unit 21 to undergo further filtration via membrane distillation. The present apparatus and system is compatible with conventional membrane distillation configurations including direct contact membrane distillation (DCMD), air gap membrane distillation (AGMD), vacuum membrane distillation (VMD) and inlet sweep gas membrane distillation (SGMD). As will be appreciated, these different types of membrane distillation differ via the taype and configuration of the internal membrane material and auxiliary apparatus as described referring to FIGS. 10*a* to 10*d*. The specific implementation of membrane distillation within the present system is described with reference to DCMD. In particular, membrane distillation unit 21 comprises a housing 21*a* incorporating a membrane distillation material arranged in a roll as illustrated in FIG. 9. According to the specific embodiment, the DCMD internal filter material comprises four layers 48, 50, 51 and 52 arranged in a collective roll such that each layer follows a continuously curved path 53 from a radially outer perimeter region to a radial centre. The rolled configuration is energy efficient being a self-insulating counter-current module with low fowling/scaling resultant from the hydrophobic membrane materials. As will be appreciated, filtration occurs via internal distillation and condensation cycles and use of at least two different layers of materials as illustrated in FIG. 9. The microporous hydrophobic membrane 47 is configured to separate the aqueous solutions at different temperatures in which the hydrophobicity of the membrane prevents mass transfer of a liquid so as to create an internal gas-liquid interface. According to the specific implementation, for DCMD, the permeate-side comprises a condensation liquid (being the cleaned filtered liquid) that is in direct contact with the membrane. The hydrophobicity of the membrane provides full retention of non-volatile components such as ions, large macromolecules and colloidal particles (e.g. fats and other particulates typically present in human solid and liquid waste).

Figure 7:
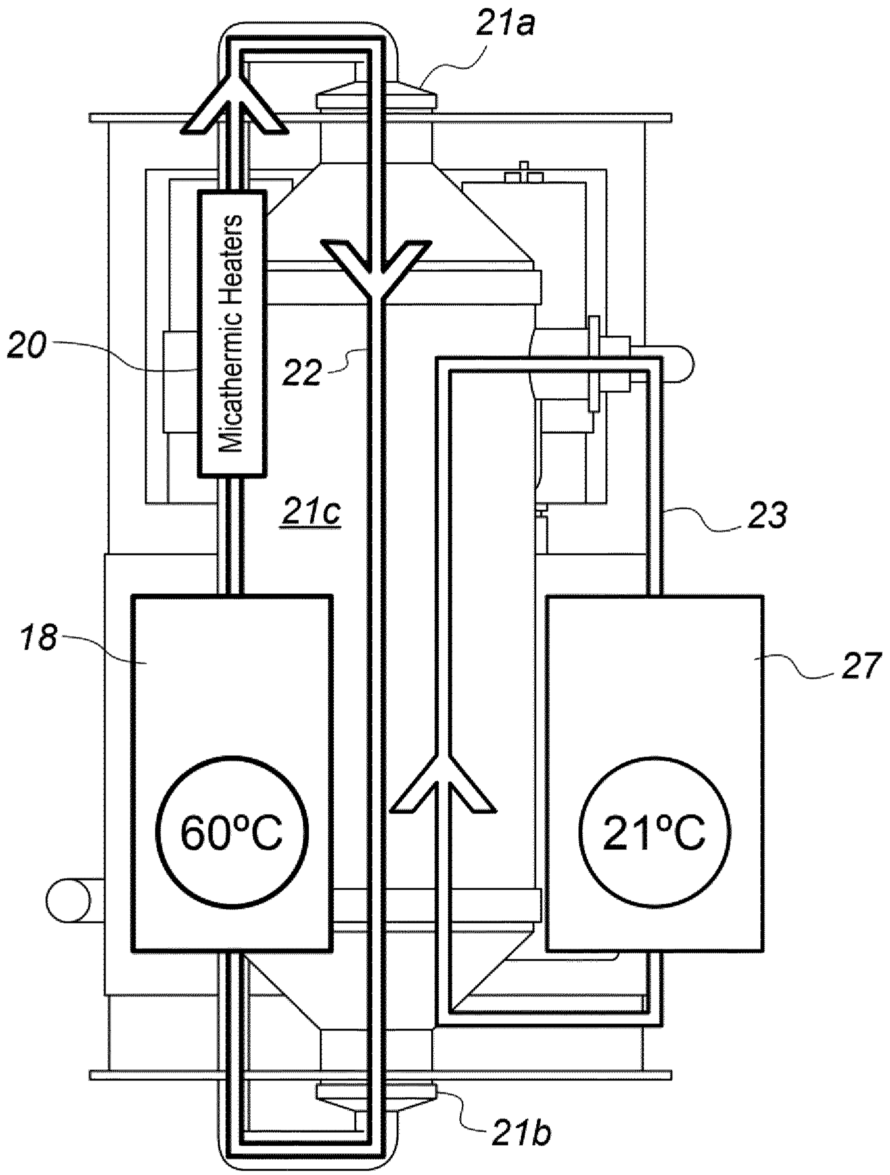
FIG. 7 illustrates schematically a liquid flow cycle through the membrane distillation unit of FIG. 6 including a feed loop and a permeate loop.

Referring to FIGS. 6 and 7, membrane distillation housing 21*a* comprises inlet 21*a* and outlet 21*b* aligned coaxially at each respective end of the housing 21*a*. Each inlet and outlet 21*a*, 21*b*, forms part of the feed loop 22 providing a waste liquid supply circuit that includes the warm feed holding tank 18, pump 19, heater 20 and membrane distillation unit 21. Feed loop 22 comprises at least one conduit and/or manifold connected via suitable connections to the membrane distillation unit and the holding tank 18. According to the specific implementation, feed loop 22 includes holding tank 18, pump 19, heater 20 and membrane distillation unit 21. Preferably, feed loop 22 further comprises an outlet conduit including, in particular, purge outlet conduit 29 connected to a purge collection tank 28. Preferably, the outlet conduit 29 is connected in a fluid flow direction between heater 20 and an inlet from the membrane distillation unit 21 that provides an inflow of the waste liquid for filtration by the membrane distillation unit 21. The purge conduit 29 is connected to the feed loop 22 via a suitable valve (not shown) that may be actuated remotely or locally. Optionally, the valve may comprise an electromagnetic valve such as a solenoid valve.

The membrane distillation unit 21 also comprises permeate loop 23 similarly flowing internally through the membrane 47 and including condenser 26, pump 25 and permeate holding tank 27. The permeate flow loop 23 comprises the membrane distillation unit, pump 25, condenser 26 and holding tank 27. The permeate holding tank 27 (and therefore the permeate loop 23) also comprises an outlet conduit 30 coupled in fluid communication to tank or outlet 32. According to the present implementation, outlet conduit 30 is connected to permeate holding tank 27 via a weir arrangement (not shown).

According to the present filtration apparatus, there is provided a membrane distillation unit having two operational liquid flow loops including the feed loop 22 and the permeate loop 23, with both loops 22, 23 flowing through the membrane distillation unit 21 simultaneously. Such an arrangement is advantageous to collect permeate at a continuous or semi-continuous process whilst maximising energy efficiency. The feed loop 22 may be cycled through the membrane distillation unit 21 whilst the composition of the permeate loop 23 is monitored in real-time so as to determine a status of the filtration process.

Importantly, the current apparatus is configured to provide elevated temperature filtering of the waste liquid that includes high concentrations of urea. Heater 20 is controllable to provide heating of liquid within feed loop 22 so as to avoid boiling of the feed loop liquid and in particular the generation of nitrogen gas within the membrane distillation unit 21. However, heater 20 is configured to provide sufficient heat to drive the membrane distillation process and the collection of the permeate/condensate so as to establish the separate feed and permeate loops 22, 23. Preferably the heater 20 comprises one or more Peltier heating devices that may be controlled locally or remotely via a specific heating control unit or via a global control unit (71). Optionally, membrane distillation unit 21 may comprise a heater (not shown). Optionally, the permeate conduit/manifold 23 may comprise a heater (not shown). Optionally, the heater at the membrane distillation unit 21 and/or the permeate conduit/manifold 23 may comprise one or more Peltier heating devices that may be controlled locally or remotely via a specific heating control unit or via a global control unit (71). According to the specific implementation, the permeate loop is controlled to operate at a liquid temperature of around 20 °C whilst the feed loop liquid may be maintained at around 60 °C. Output of the permeate is via outlet 54 at holding tank 27 (optionally via a weir arrangement).

Figure 8A:
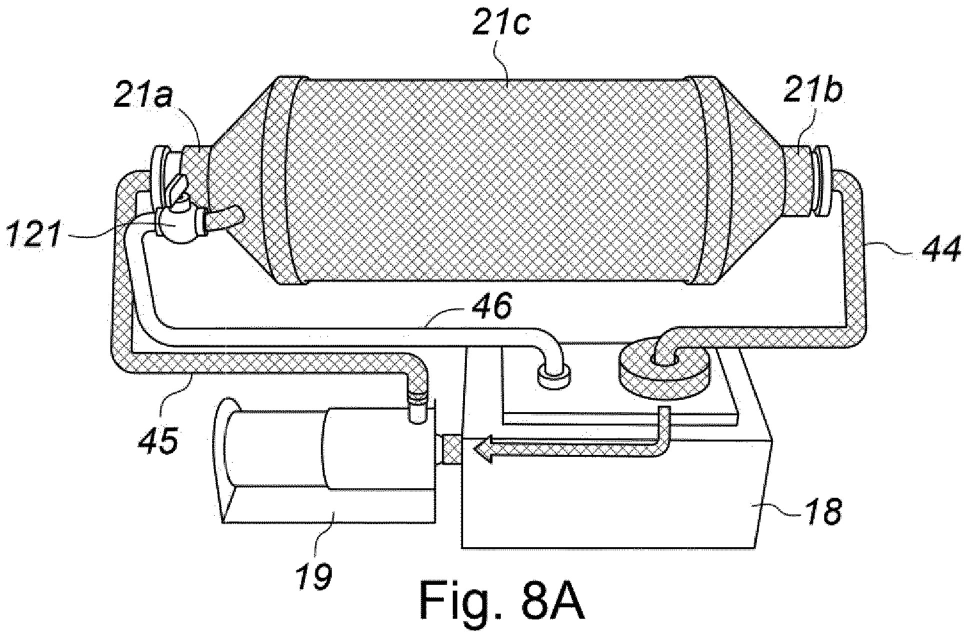
FIG. 8A is a perspective view of an operational loop of the membrane distillation unit of FIG. 6.

Referring to FIG. 8A, in an operational mode, the waste liquid (pre-filtered by unit 15) is circulated through the filtration membrane 21 between inlets and outlets 21*a*, 21*b*. The fluid flows from outlet 21*b* through conduit 44 and into tank 18. According to the specific implementation, tank 18 may comprise an internal slope and trap (not shown) to capture contaminants within the feed loop. Tank 18 may further comprise one or a plurality of filters. The feed loop waste liquid is then fed through pump 19 and returned to distillation inlet 21*a* via conduit 45. Conduit 45 comprises a heating coil/clamp (20—referring to FIG. 1) to maintain the feed loop temperature at around 60 °C.

Figure 8B:
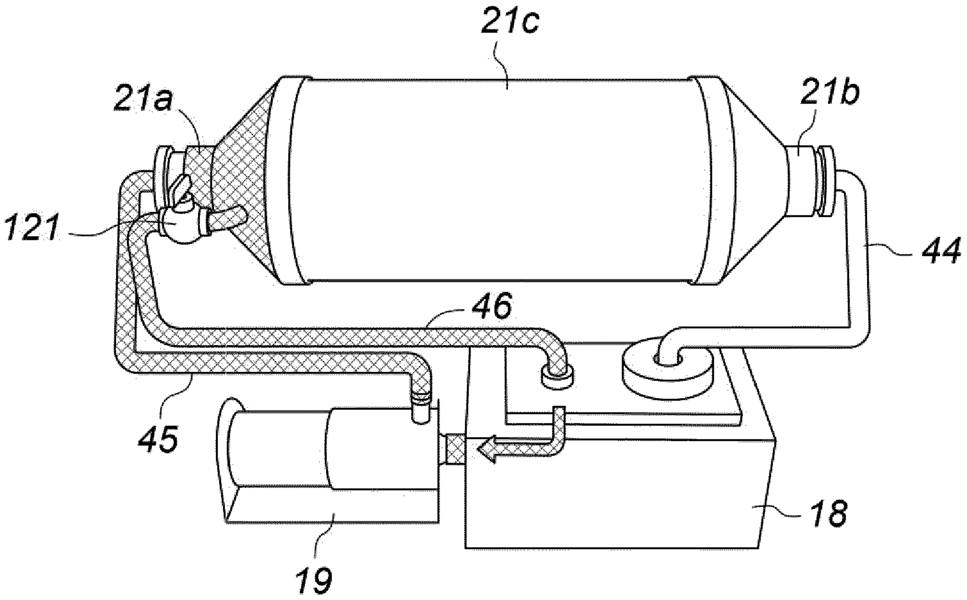
FIG. 8B is a perspective view of a cleaning loop associated with the membrane distillation unit of FIG. 6.

Referring to FIG. 8B, the present apparatus is configured for a cleaning mode to purge the filtration membrane 47 and dislodge and expel contaminants and impurities that accumulate internally within the feed loop and in particular within membrane distillation unit 21. A ball valve 121 is actuated to divert the fluid flow through conduit 46 to replace conduit 44 and outlet 21*b* of the operational loop of FIG. 8A. In the cleaning mode, the liquid flow enters and exits at the inlet end of the housing 21*c* to circulate through a part of tank 18 and pump 19 during the purge operation.

Figure 10A:
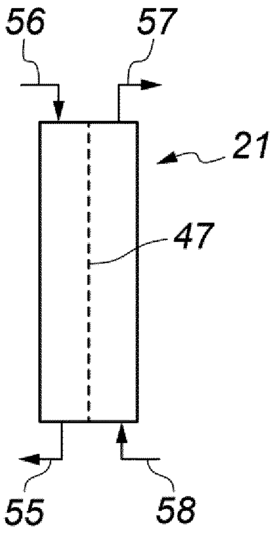
FIG. 10A is a schematic view of the present membrane distillation unit having a direct contact membrane distillation (DCMD) configuration according to a specific implementation.
Figure 10B:
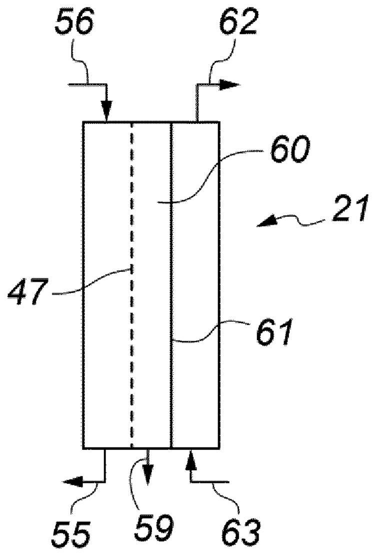
FIG. 10B is a schematic view of the present membrane distillation unit having a direct contact air gap membrane distillation (AGMD) configuration according to a specific implementation.
Figure 10C:
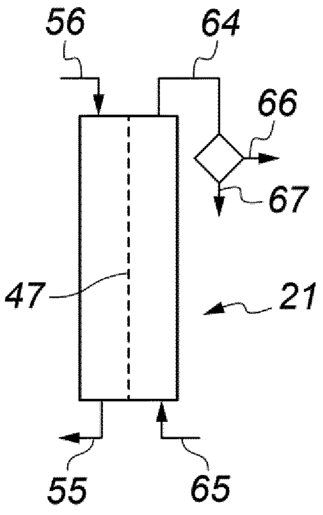
FIG. 10C is a schematic view of the present membrane distillation unit having a direct contact sweep gas membrane distillation (SGMD) configuration according to a specific implementation.
Figure 10D:
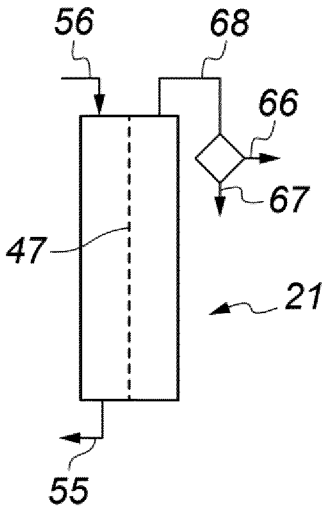
FIG. 10D is a schematic view of the present membrane distillation unit comprising a direct contact vacuum membrane distillation (VMD) configuration according to a specific implementation.

Referring to FIG. 10A, and as described previously, the present system 10 is compatible for operation with a variety of different types of membrane distillation materials and configurations. When implemented for DCMD, the membrane distillation unit 21 comprises a feed loop inflow 56 and feed loop outflow 55 and a corresponding permeate inflow 58 and outflow 57 with the two respective flow paths within distillation unit 21 separated by membrane 47. When implemented in an AGMD configuration unit 21 comprises the feed loop inflow and outflow 56, 57, a product outflow 59 and a cooling liquid inflow 63 and outflow 62. An internal condensation plate 61 and membrane 47 provides an air gap 60 between the respective feed and the cooling fluid flow pathways through unit 21. Referring to FIG. 10C and when implemented as a SGMD configuration, the distillation unit 21 comprises a supply inflow 56 and an outflow 55 and a corresponding sweep gas inflow 65 and sweep gas outflow 64 with the two internal flow paths separated by membrane 47. The sweep gas outflow 64 is coupled through a condenser 66 and a permeate collection 67. Referring to FIG. 10D when implemented as a VMD configuration, the distillation unit 21 comprises a feed loop supply inflow 56 and outflow 55 together with internal membrane 57. A vacuum manifold 68 is coupled to the partitioned second region within the distillation unit 21 to provide collection of the permeate via condenser 66.

Figure 11:
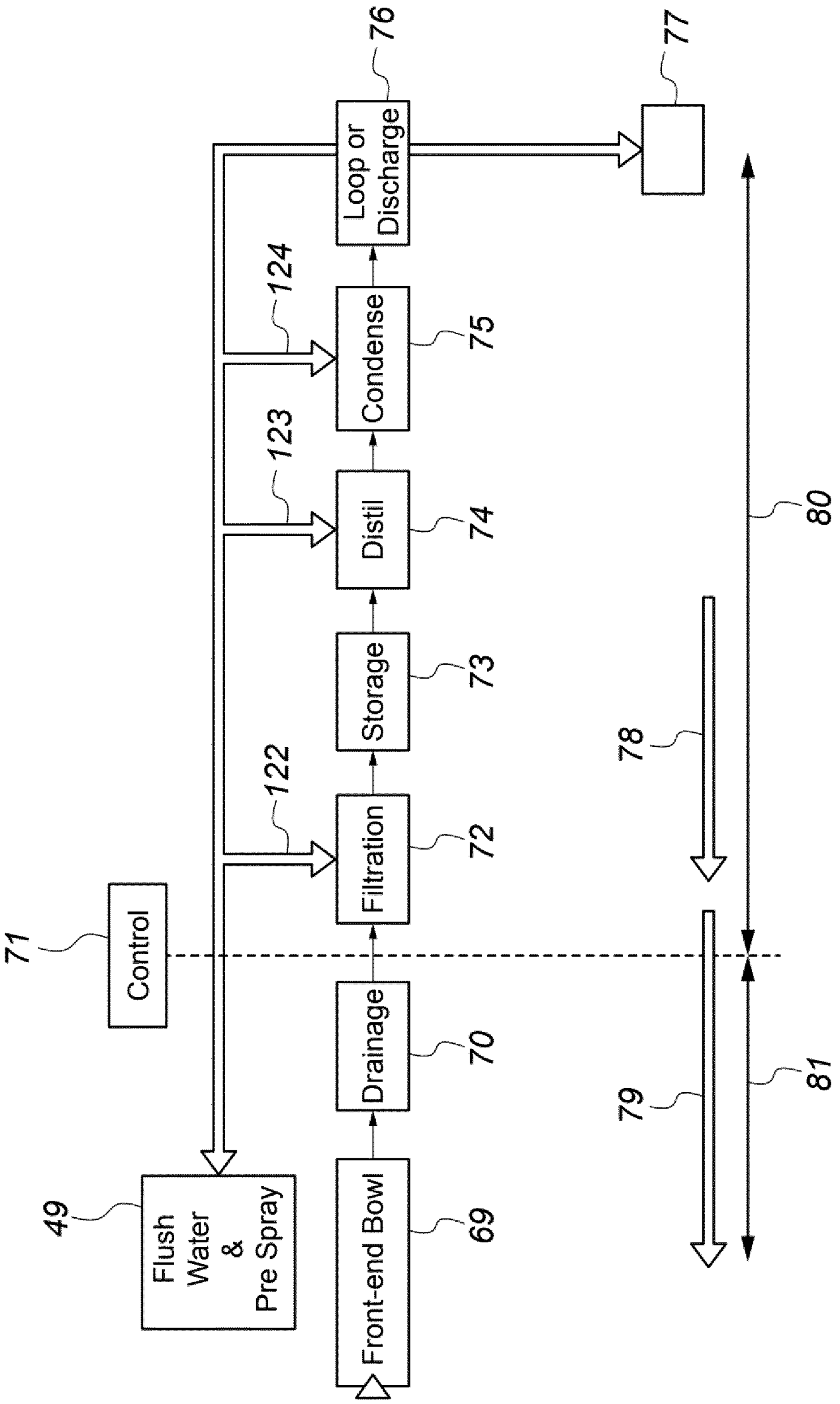
FIG. 11 is a schematic flow diagram of one operational flow pathway of the membrane distillation system of FIG. 1.

In operation and referring to FIG. 11, both solid and liquid human waste is deposited in toilet 11 at stage 69. A spray or flush water reservoir may be coupled to toilet 11 to provide flushing and rising of the toilet bowl via the supply reservoir at stage 49. The deposited solid and liquid waste is dispensed from the bowl into a toilet holding chamber (described referring to FIGS. 12 and 18A to 18C). A drainage port, filter and conveyor provide separation and drainage of the solid and liquid waste at stage 70 from the front end toilet. The diaphragm pump 13 then operates to deliver the predominantly liquid waste through manifold 14 to the pre-filtration unit 15 wherein the liquid is pre-filtered by a plurality of in-series flow filtration units. The pre-filtered liquid is then delivered to holding tank 18 at stage 73. The waste liquid is then transferred to membrane distillation unit 21 at stage 74 as a heated liquid feed loop. Condensate is then collected at stage 75 via the distillation and condensation cycle within the distillation unit 21 and via the simultaneous feed loop 22 and permeate loop 23 networks. The condensate is then collected within the permeate holding tank 27 at stage 76. The permeate may then be supplied to a finishing stage 77 in which the permeate is filtered through a charcoal, UV or other biological filter to remove biological species such as microbes, viruses, bacteria and the like. Stage 77 may also comprise filtering through appropriate filters to reintroduce nutrients into the permeate liquid for example to adjust pH and to introduce salts, ions, organic or inorganic compounds or biological species. Permeate holding tank 27 is provided with a weir overflow outlet 54 (FIG. 6) for the supply of permeate from tank 27 to the final stage 77. As described, the pre-filtration unit 15 may be purged of entrapped solid particulates via a back-wash loop liquid flow 79. Similarly, distillation unit 21 may be purged via a purge flow 78 to protect membrane distillation material by purging entrapped contaminant. The membrane distillation unit may be supplied with stored water via flow pathway 124 provided in fluid communication between the ‘front-end’ liquid reservoir and distillation unit 21. Accordingly, those components associated with stages 49, 69, 70 may be regarded as ‘front-end’ components 81 and those components associated with stages 72, 73, 74, 75, 76, 77, 122, 123 and 124 may be regarded as ‘back-end’ components 80. The purged concentrates may then be reused as a return flow 78 potentially to the initial front end fluid reservoir or for other uses such as tap and toilet water and as a backwash flow 79. The return flow of the purged concentrates includes solid particulates and these may be returned to the front end tank or the toilet chamber for cycled separation of solid and liquid matter via screw conveyor 42 and filter 41.

Figure 14:
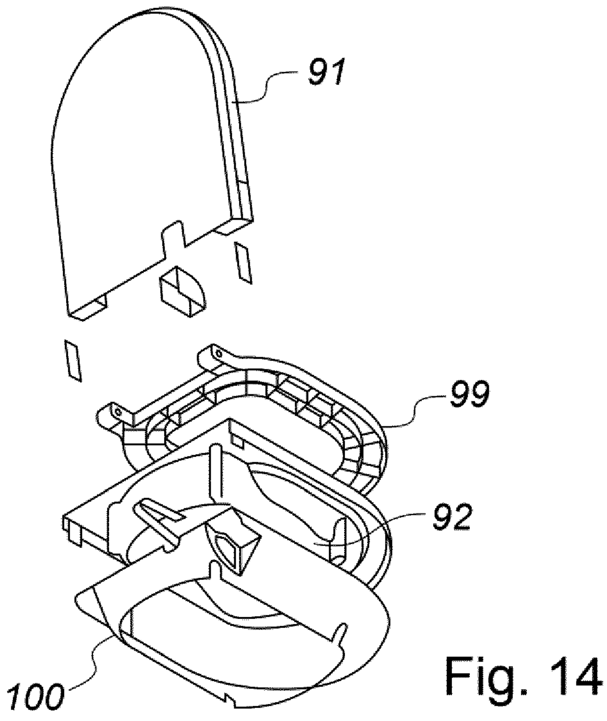
FIG. 14 is an underside exploded perspective view of selected upper components of the toilet of FIG. 12.
Figure 15:
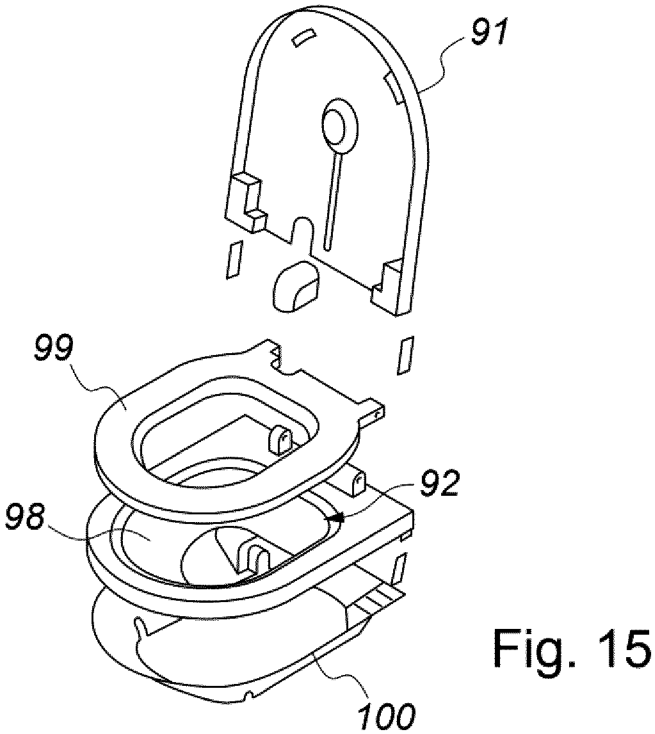
FIG. 15 is a downward exploded perspective view of selected upper components of the toilet of FIG. 12.

The membrane distillation system 10 is compatible for use with a dry or semi-dry toilet (that requires little or no flushing water). According to the specific implementation, the toilet 11 comprises a bowl indicated generally by reference 90 into which is deposited solid and liquid waste. Bowl 90 is divided into a generally stationary upper bowl part 92 and a rotatable lower bowl part 93. A cross-sectional area of the bowl 90 increases from a trough or lower region (defined by the rotatable lower bowl part 93) to the uppermost rim end of the stationary upper bowl part 92. Upper bowl part 93 comprises a bowl wall that defines an internal facing upper bowl surface 97 and lower bowl part 93 comprises a bowl wall having an internal facing lower bowl surface 98. Upper and lower bowl surfaces 97, 98 collectively define the open cavity or recess that is the receiving bowl 90. A toilet seat 99 is hingeably mounted together with a toilet lid 91 to sit over and about an uppermost rim of the upper bowl part 92. The upper and lower bowl parts 92, 93 are mounted and housed at least partially within a main toilet housing or frame 96. Housing 96 defines an internal solid and liquid waste receiving chamber 95. Referring to FIGS. 14 and 15, upper bowl part 92 is mounted at housing 96 via a seat flange 100. Referring to FIG. 14 lower bowl part 93 is rotatably mounted at least partially within chamber 95 and at a generally upper region thereof. An elongate part cylindrical jacket 94 projects upwardly and rearwardly at an inclined angle from a lowermost region of chamber 95 and housing 96.

Figure 12:
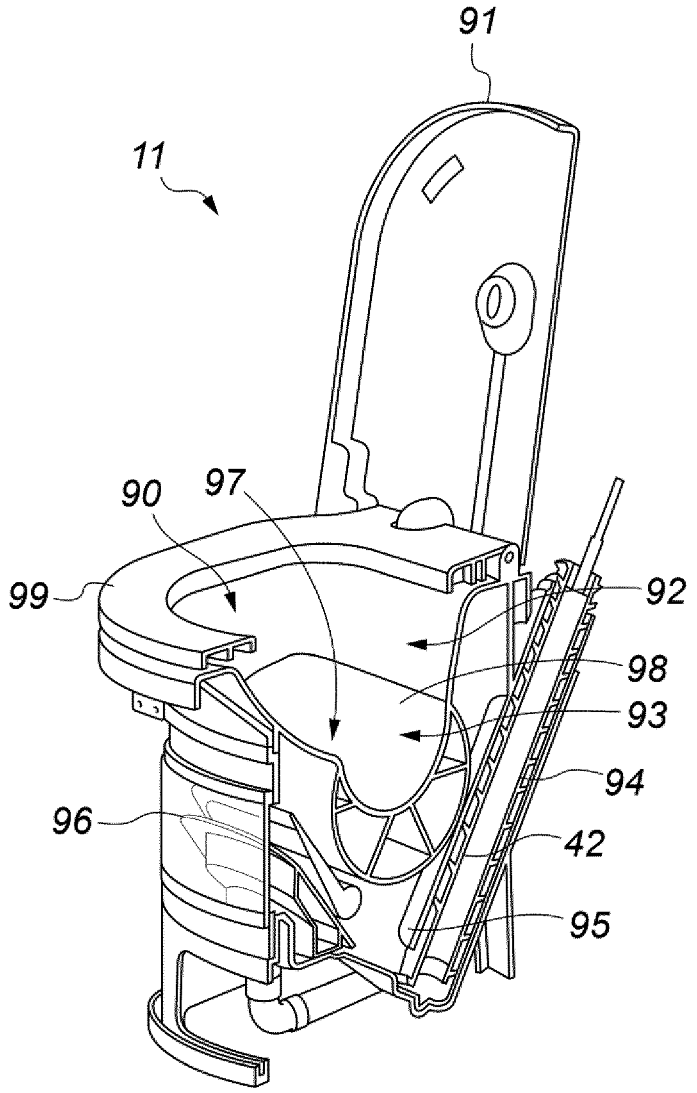
FIG. 12 is a partial cross-sectional perspective view of a toilet forming a 'front end' unit of the membrane distillation system of FIG. 1.
Figure 16:
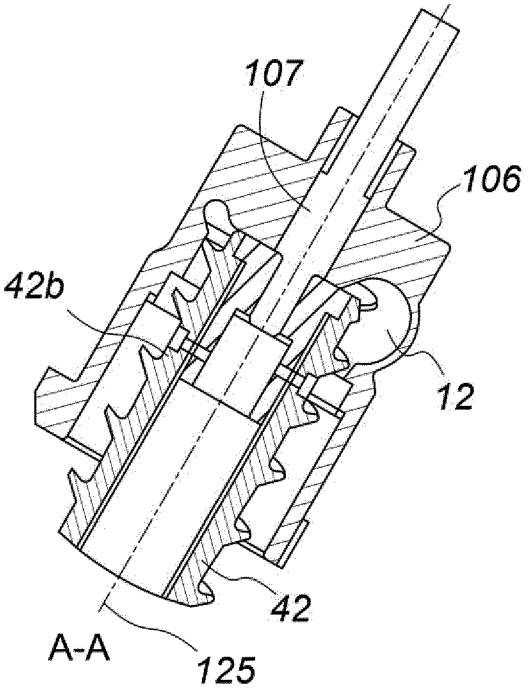
FIG. 16 is a cross-sectional view of an upper region of a screw conveyor forming part of the toilet of FIG. 12.
Figure 17:
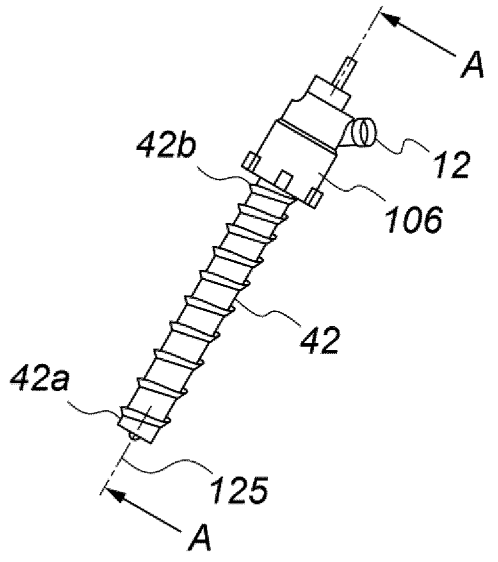
FIG. 17 is a perspective view of the screw conveyor of FIGS. 12 and 16.

Referring to FIGS. 12, 16 and 17, screw conveyor 42 is rotatably mounted within jacket 94. Screw conveyor 42 is elongate and comprises a first end 42*a* extending into the lowermost region of chamber 95 and a second upper end 42*b* projecting upwardly and from housing 96 whilst being housed within jacket 94. A conveyor head 106 provides a hollow mounting to accommodate a drive motor and axel 107 for the rotational drive of screw conveyor 42 about axis 125. Head 106 comprises the drain port 12 connectable to a solid waste collection tank (not shown).

Figure 13:
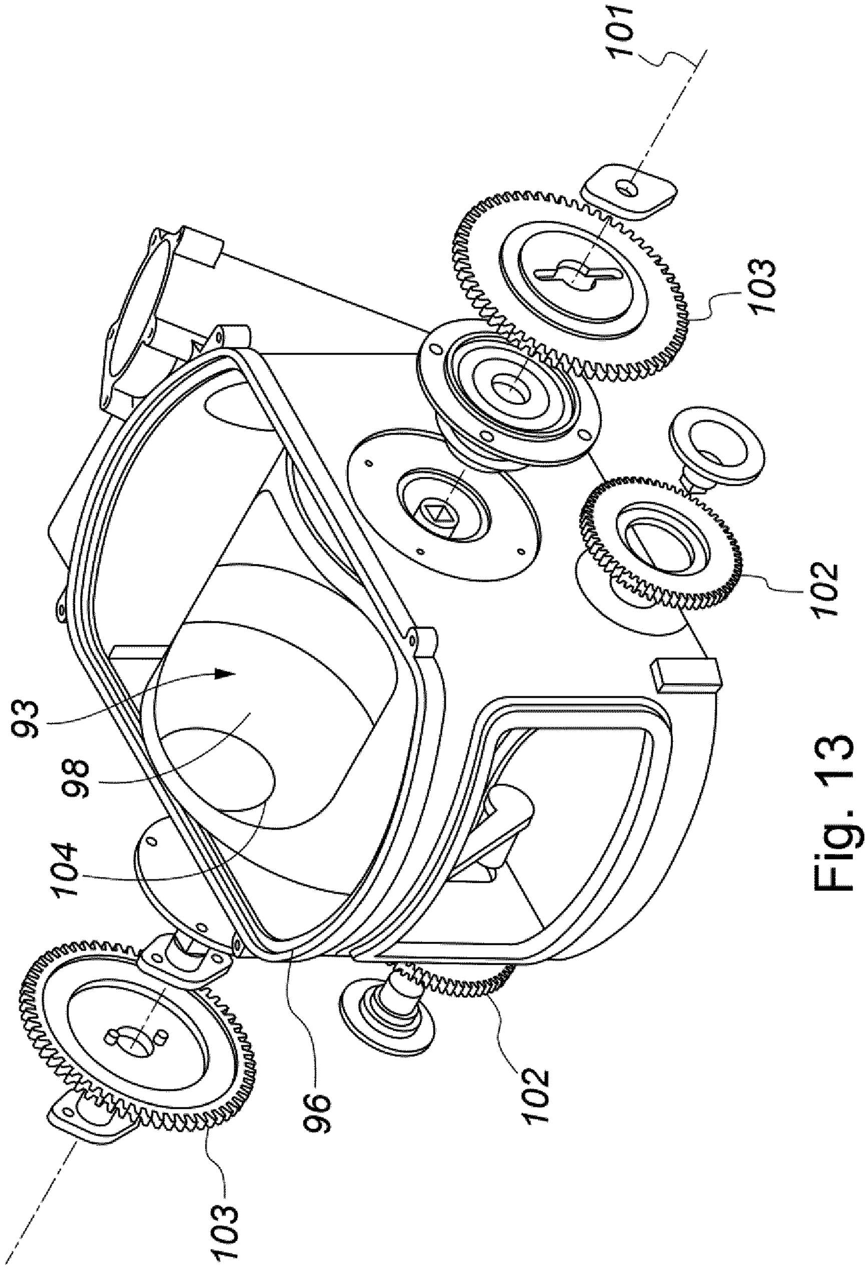
FIG. 13 is an exploded perspective view of a lower region of the toilet of FIG. 12.

Referring to FIG. 13, bowl lower part 93 is rotatably mounted on rotational axis 101. In particular, lower bowl part 93 comprises a hollow drum-like configuration having an opening 104 into the internal cavity or recess that defines the lower region of bowl 90 via bowl surface 98. Surface 98 is continuously curved and is profiled so as to align or generally align with surface 97 of the upper bowl part when the lower bowl part 93 is rotated into a first position as illustrated in FIG. 12 to receive solid and liquid waste. That is, in this first position, the collective bowl surface is generally seamless to present a singular and continuous surface via the positional alignment of the respective lower and upper bowl surfaces 98, 97.

A driveable gear 103 is mounted either end of the rotatable drum-like body of the lower bowl part 93 externally at housing 96. A drive motor or other actuator (not shown) is mounted internally within housing 96 and comprises a drive axel (not shown) that extends through housing 96 to mount a corresponding driving gear 102. Drivable and driving gears 103, 102 are meshed such that actuation of the drive motor (not shown) provides a corresponding rotation of lower bowl part 93 about axis 101. In use, solid and liquid waste is deposited in bowl 90 and settles within the drum-like lower bowl part 93. Part 93 is then rotated about axis 101 within chamber 95. A rotational angle by which lower part 93 is rotated may be in the region 45 to 180 or more preferably at least 45 or at least 90° so as to empty the contents from lower bowl part 93 into chamber 95. The solid and liquid waste then settles within the lower part of chamber 95 in contact with the lower first end 42*a* of screw conveyor 42. The solid and liquid waste is then transported upwardly in the direction along axis 125. During this upward transport, the liquid and solid waste is separated via the use of filter 41 (referring to FIG. 5) provided in fluid communication with the liquid and solid waste slurry.

Figure 18C:
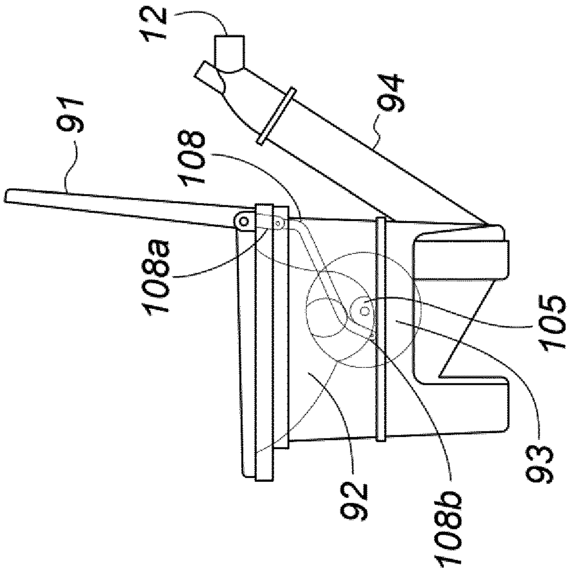
FIG. 18C is a cross-sectional/transparent view of the toilet of FIG. 12 in a third rotational position according to the specific implementation of FIG. 18A.
Figure 18B:
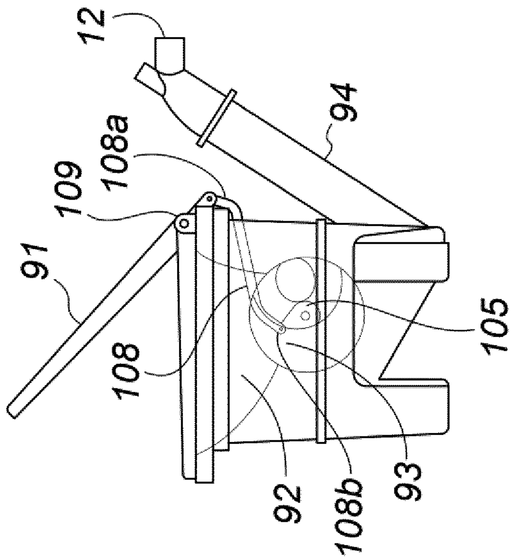
FIG. 18B is a cross-sectional/transparent view of the toilet of FIG. 12 in a second rotational position according to the specific implementation of FIG. 18A.
Figure 18A:
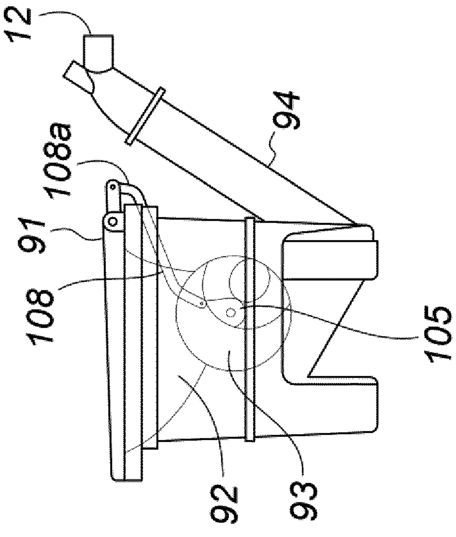
FIG. 18A is a cross-sectional/transparent view of the toilet of FIG. 12 in a first rotational position according to a further specific implementation having a mechanical actuating link for actuating rotational movement of selected components according.

A further specific implementation of the front-end toilet is described referring to FIGS. 18A to 18C. The majority of the components and function described referring to FIGS. 12 to 17 are common to the further embodiment of FIGS. 18A to 18C. However, in place of the drive motor and gears 102, 103, rotation of the lower bowl part 93 is provided by a mechanical arm actuator 108. Actuator 108 comprises a first end 108*a* pivotally mounted to lid 91 and a second end 108*b* pivotally connected to the lower bowl part 93 via a cam 105.

Accordingly, as lid 91 is pivoted about an axis 109, actuator 108 is translated upwardly and laterally so as to rotate lower bowl part 93 about axis 101. That is, in the receiving position of FIG. 18C with the lid 91 in the 'open' position, surfaces 97 and 98 align whilst in the lid 'closed' position of FIG. 18A, the lower bowl part 93 is rotated at an angle of around 120° to empty the contents of bowl 90 into chamber 95. The lid 91 may then be pivoted and the toilet 11 returned to a status ready for use.

As will be appreciated, the various mechanical, electro-mechanical, electrohydraulic pumps, valves and components of the system 10 may be controlled via suitable control unit 71 (FIG. 11). Control unit 71 may comprise conventional local or remote computer systems including processors, memory, human interface, data storage, wired and wireless communication for remote to cloud data transfer and wired or wireless control of the various electromechanical components of the system 10. The present system 10 via control unit 71 may be operational for fully automatic, semi-automatic or manual operation of the various pumps, valves, heating units etc. The system 10 may further comprise a plurality of different types of sensor located at various positions within the system 10 for operational status monitoring and feedback. Such sensors may include liquid and gas flow sensors, temperature sensors, pH sensors, pressure sensors, biological sensors, motion sensors, proximity or contact sensors etc. In particular, the toilet 11 may comprise one or a plurality of sensors to detect waste deposited into bowl 90 and/or chamber 95 so as to provide automatic actuation of screw conveyor 42 and pump 13. Similarly, membrane distillation unit 21 may be controlled via control unit 71 including in particular control of pump 19, heater 20, pump 25 and purge components and operation 28 via specific sensors at unit 21. The purge operation associated with the pre-filtration unit 15 may similarly be controlled by control unit 71 including control of the valves 34, 37, 38, 39 via specific sensors. Level sensors within tanks 16*a*, 17*a*, 18, 27, 32 and 95 may provide associated feedback and control of one or more components to avoid capacity filling of the tanks which would otherwise render the system inoperable. Accordingly, the present system 10 may comprise suitable safety liquid outflow ports at one or a plurality of positions associated with the above-mentioned tanks and storage chambers and reservoirs. Such safety outflow ports may be coupled to a suitable manifold for discharge or transport to a further master holding tank.

The invention claimed is:

1. Human waste processing apparatus comprising:

at least one pre-filter treatment unit having a pre-filter storage tank, a particulate filter to separate particulate suspended within waste liquid and a liquid flow inlet and outlet;

a membrane distillation unit having a membrane distillation vessel with an internal filter membrane, a primary flow liquid inlet and outlet and a permeate flow outlet, the primary flow liquid inlet connected in fluid communication to the liquid flow outlet of the pre-filter treatment unit; and a flow actuator to drive a flow of waste liquid through the pre-filter treatment unit and in a flow direction towards the membrane distillation unit;

a waste liquid feed conduit connected in fluid flow communication with the primary flow liquid inlet and outlet of the membrane distillation unit to provide a waste liquid feed loop, such that waste liquid is circulated through the membrane distillation unit between the inlet and outlet the membrane distillation unit.

2. The apparatus as claimed in claim 1 wherein the pre-filter treatment unit comprises:

a first pre-filter treatment unit having a first pre-filter storage tank and a first particulate filter; and/or a second pre-filter treatment unit having a second pre-filter storage tank and a second particulate filter.

3. The apparatus as claimed in claim 2 wherein the first particulate filter comprises a first mesh pore size; and the second particulate filter comprises a second mesh pore size being less than the first mesh pore size.

4. The apparatus as claimed in claim 2 wherein the first and/or second pre-filter treatment unit comprise respective mountings to releasably mount the first and/or second particulate filters to enable removal and insertion of the first and/or second particulate filters at the respective first and/or second pre-filter treatment units.

5. The apparatus as claimed in claim 2 wherein the first and/or second pre-filter treatment units comprise a respective purge valve and purge outlet connected in fluid communication to the respective particulate filters, the apparatus further comprising respective return flow conduits extending from the purge outlets to a front end holding tank and/or the least one pre-filter treatment unit to provide a filtration circuit.

6. The apparatus as claimed in claim 5 wherein the apparatus further comprises a supply flow conduit connected in fluid communication to the front-end holding tank and the liquid flow inlet of the pre-filter treatment unit.

7. The apparatus as claimed in claim 5 further comprising a solid-liquid coarse filter to separate solid waste from the waste liquid positioned in a fluid flow direction upstream of the pre-filter treatment unit.

8. The apparatus as claimed in claim 7 further comprising a solid-liquid screw conveyor to transport and separate the solid waste and waste liquid and positioned in a fluid flow direction upstream of the pre-filter treatment unit.

9. The apparatus as claimed in claim 7 wherein the flow actuator is a pump connected in a fluid flow direction between the solid-liquid coarse filter and the pre-filter treatment unit.

10. The apparatus as claimed in claim 1 further comprising a holding tank positioned in a fluid flow direction between the pre-filter treatment unit and the membrane distillation unit.

11. The apparatus as claimed in claim 10 comprising a first distillation flow pump to drive a flow of liquid from the holding tank to the membrane distillation unit.

12. The apparatus as claimed in claim 1 further comprising at least one heater unit connected in fluid flow communication with the membrane distillation unit to heat waste liquid transferred to the membrane distillation unit.

13. The apparatus as claimed in claim 1 comprising a first distillation flow pump to drive a flow of liquid from the holding tank to the membrane distillation unit and at least one heater unit connected in fluid flow communication with the membrane distillation unit to heat waste liquid transferred to the membrane distillation unit, wherein the waste liquid feed loop comprises the first distillation flow pump and the heater unit such that waste liquid is capable of being circulated through the first distillation flow pump, the heating unit and the membrane distillation unit as a liquid flow loop.

14. The apparatus as claimed in claim 13 further comprising a holding tank positioned in a fluid flow direction between the pre-filter treatment unit and the membrane distillation unit, wherein the waste liquid feed loop also comprises the holding tank, wherein the holding tank comprises a first inlet to receive waste liquid from the waste liquid feed loop conduit and a second inlet to receive waste liquid from the pre-filter treatment unit.

15. The apparatus as claimed in claim 14 wherein the holding tank further comprises at least one outlet provided in fluid flow communication with the membrane distillation unit, the first distillation flow pump and/or the heater unit.

16. The apparatus as claimed in claim 1 further comprising a permeate collection reservoir to collect liquid permeate output from the permeate flow outlet.

17. The apparatus as claimed in claim 1 wherein the membrane distillation unit further comprises a permeate flow inlet connected in fluid flow with the permeate flow outlet to provide a permeate flow loop through the filter membrane.

18. The apparatus as claimed in claim 17 further comprising:

a holding tank positioned in a fluid flow direction between the pre-filter treatment unit and the membrane distillation unit;

a first distillation flow pump to drive a flow of liquid from the holding tank to the membrane distillation unit; and a second distillation flow pump connected in fluid flow with the permeate flow loop.

19. The apparatus as claimed in claim 16 comprising a permeate output filter connected in fluid communication to an outlet of the permeate collection reservoir to receive and collect output from the membrane distillation unit.

20. The apparatus as claimed in claim 1 wherein the membrane distillation unit comprises a configuration being any one of:

direct contact membrane distillation (DCMD);

air gap membrane distillation (AGMD);

sweep gas membrane distillation (SGMD);

vacuum membrane distillation (VMD).

21. The apparatus as claimed in claim 1 wherein the membrane distillation unit comprises an air gap membrane distillation configuration and the apparatus further comprises:

a cooling fluid network having a fluid flow conduit to contain a cooling fluid, a cooling fluid tank, and a cooling fluid pump to drive a flow of the cooling fluid through the conduit.

22. The apparatus as claimed in claim 1 wherein the membrane distillation unit comprises a vacuum membrane distillation configuration and the apparatus further comprises:

a vacuum manifold having a vacuum pump and a condenser connected to the membrane distillation vessel to drive a flow of permeate from the membrane to the condenser.

23. The apparatus as claimed in claim 2 wherein:

the first particulate filter comprises a mesh pore size in a range 50 to 800 μm, 50 to 150 μm or 80 to 120 μm; and/or the second particulate filter comprises a mesh pore size in a range 0.5 to 50 μm, 0.5 to 20 μm, 0.5 to 10 μm or 0.5 to 5 μm.

24. The apparatus as claimed in claim 19 wherein the permeate output filter comprises a carbon filter including any one or a combination of:

charcoal, activated charcoal, an antimicrobial.

* * * * *